United States Patent [19]
Noe

[11] 3,742,203
[45] June 26, 1973

[54] ADJUSTABLY ILLUMINATED PICTURE FRAME

[76] Inventor: Joe T. Noe, 308 Joaquin Road, Arcadia, Calif. 91006

[22] Filed: Sept. 10, 1971

[21] Appl. No.: 179,501

[52] U.S. Cl................. 240/4, 40/152.2, 240/2 AD, 240/4.1
[51] Int. Cl............................................. F21v 33/00
[58] Field of Search.................... 240/2 R, 2 AD, 4, 240/4.1, 4.2; 40/152.2

[56] References Cited
UNITED STATES PATENTS

| | | | |
|---|---|---|---|
| 2,677,909 | 5/1954 | Heydenryk........................ | 40/152.2 |
| 2,233,280 | 2/1941 | Barnes.............................. | 240/4 X |
| 947,127 | 1/1910 | Roberts............................. | 240/4 |
| 2,677,751 | 5/1954 | Marchand......................... | 240/4.1 |

FOREIGN PATENTS OR APPLICATIONS 715,134   9/1931   France............................. 40/152.2

Primary Examiner—Richard L. Moses
Attorney—William H. Maxwell

[57] ABSTRACT

A frame for the mounting of paintings or pictures and the like, and wherein at least one margin of the frame carries recessed lighting extending longitudinally thereof and adjustable either directly or remotely to vary the angularity of the light source, there being a reflective diffuser that spreads the light, and to the end that efficient illumination is obtained for the display of the art work as circumstances require.

20 Claims, 6 Drawing Figures

PATENTED JUN 26 1973 3,742,203

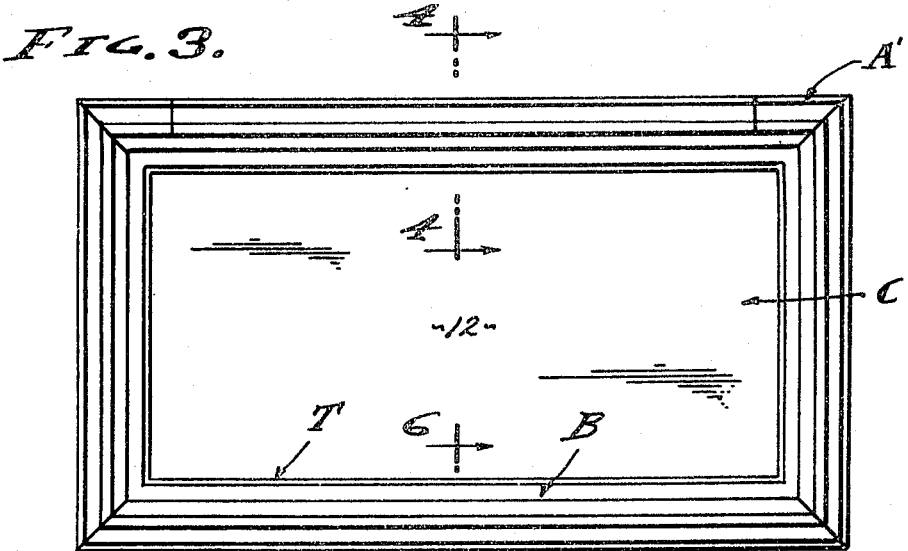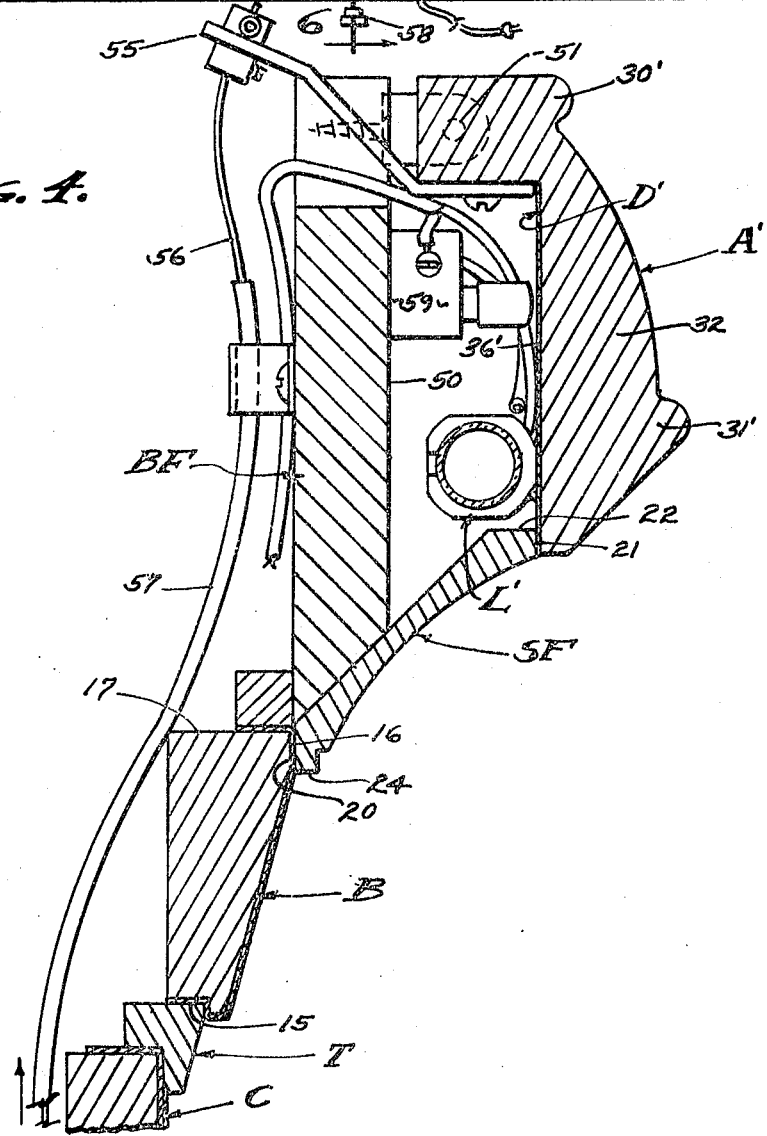

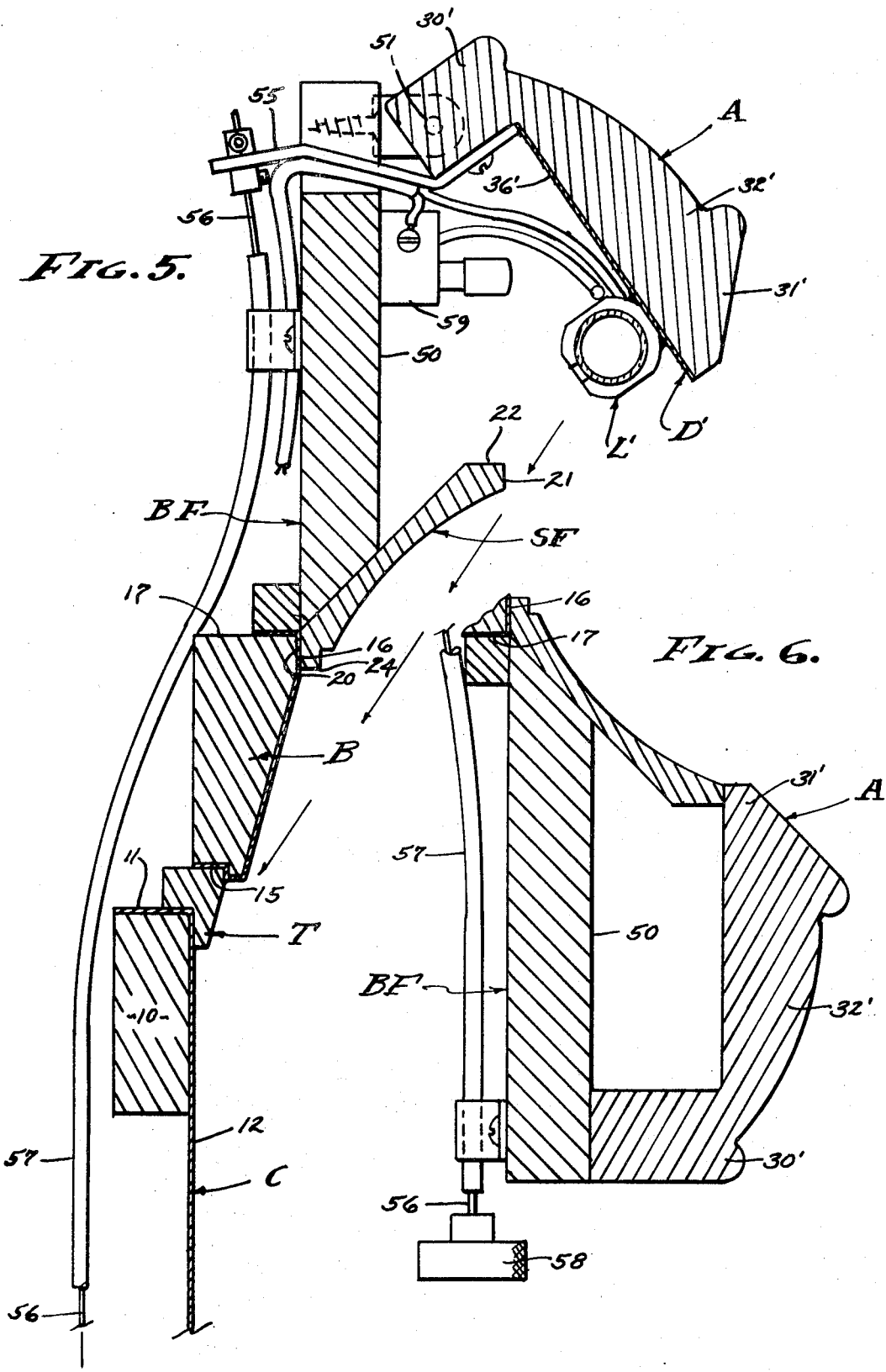

ADJUSTABLY ILLUMINATED PICTURE FRAME

BACKGROUND

The lighting of paintings or pictures becomes an individual problem with each framing, since the light requirements of each painting or picture varies dependent upon the surrounding availability of light. Most often, inadequate lighting makes it impossible to develop the most out of such works of art and as a consequence there are refinements and various techniques thereof that are usually inadequately displayed. For example, colorful detail and the application of pigments etc. are important features of the art work which can be enjoyed only through properly adjusted illumination; and to these ends I have provided an adjustably illuminated picture frame, with the illumination thereof incorporated therein as distinguished from an independent external source or attachment.

FIELD OF INVENTION:

Picture frames are usually lighted externally and/or independently by means of room lighting and/or closely positioned or attached fixtures. In practice, the added fixtures are most often employed since room lighting is insufficient, but invariably as a compromise in lighting efficiency and effect. Therefore it is an object to provide efficient illumination in the frame structure mounting a painting or picture, whereby the art work can be displayed to its fullest.

The lighting of paintings or pictures, and especially oil paintings, requires a diffused lighting source for best viewing while the source of an illuminating means is in practice a point or line source of light. The concentrated source of light operates to a disadvantage when its position results in intense reflections off the surface of the art work and projected into the line of sight of the viewer. Therefore, it is another object of this invention to provide for adjustability of the light source within the frame structure which houses the same. It is also an object of this invention to provide a retractably exposable light source that is remotely adjustable and which casts diffused light upon the picture plane without shadows and in a direction conducive to non-reflective illumination. That is, the reflection of high intensity highlights is substantially eliminated.

SUMMARY OF INVENTION:

This invention involves frames for the mounting of paintings or pictures and the like, and with hidden lighting means incorporated therein to cast light upon the picture plane without interferring shadows. Elongated lighting tubes are employed at and along at least one margin of the frame combination, a plurality of interdependent frames being employed; there being a border frame that mounts the canvas frame and/or picture; and there being a picture frame overlying and surrounding the border frame; and there being a sub frame disposed between the said border and picture frame hold them in depth relation for the accommodation of the advantageous placement of the lighting. The said lighting is electrical and involves slender incandescent or fluorescent tubes that are adjustably moveable to change the reflective angle of light radiated onto the painting or picture surface, there being a reflective diffuser that reduces the effect of light source angularity. One form of frame combination is fixed with an adjustably moveable light source, and a second form of frame combination is remotely adjustable and moveable so as to position the light source selectively and to alternately retract the same.

DRAWINGS:

The various objects and features of this invention will be fully understood from the following detailed description of the typical preferred forms and applications thereof, throughout which description reference is made to the accompanying drawings, in which:

FIG. 1 being a front elevation of a typical frame, and FIG. 2 being an enlarged detailed sectional view taken as indicated by line 2—2 on FIG. 1.

FIGS. 3, 4 and 5 illustrate a second embodiment wherein the lighting means is fixed to and moveable with a frame member that is shiftable relative to the other frame members of the combination; FIG. 3 being a front elevation of a typical frame, and FIG. 4 being an enlarged detailed sectional view showing the retracted condition of the lighting means taken as indicated by line 4—4 on FIG. 3.

FIG. 5 is a view similar to FIG. 4, showing the operative condition of the lighting means.

FIG. 6 is an enlarged detailed sectional view taken as indicated by line 6—6 on FIG. 3.

Figure 1:
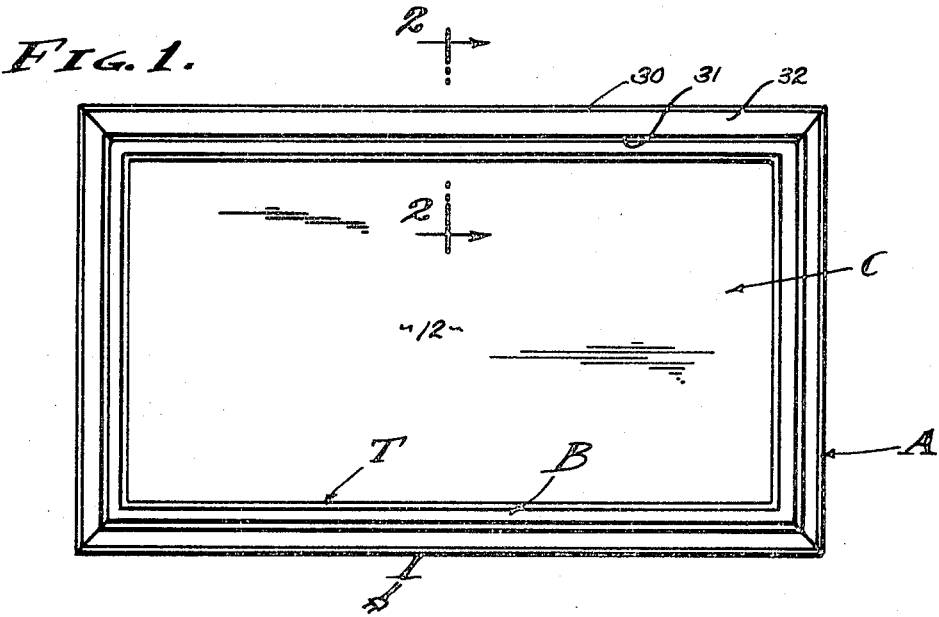
FIG. 1 and 2 illustrate a first embodiment wherein the lighting means is adjustably moveable within a fixed combination of frame members.

PREFERRED EMBODIMENT:

The framing of paintings or pictures varies according to the requirements of each work of art, and generally there is a surrounding frame A that receives and carries the canvas C and the canvas frame 10 upon which the painting 11 is stretched. There are of course variations in the art work structure, but in any case it is a planar surface 12 that is to be displayed and it is the detail and perfection of the artist's techniques applied to surface 12 which are to be properly illuminated. Therefore, the frame A is essentially a furnishing of presentable nature and made of carefully selected cross sections that are pleasing in appearance while embracing the art work so as to center and/or draw attention to the same without distractions. To these ends it is common practice to construct the frame A of beveled and arcuately channeled or fluted cross sections joined together at mitered corners.

A refinement of picture frame construction is the provision of a border frame B that establishes a marginal separation between the art work and the surrounding frame A. The border frame B is most often of substantial marginal width with a front planar surface that is flat or slightly inclined as shown, and disposed intermediate the canvas C and the frame A. It is usual practice to bevel and/or step the frame A and border frame B outwardly and forwardly from the picture surface 12, so that the combined frames project forwardly from the canvas. In practice, the front planar surface of the border frame B is of neutral coloring that forms a non-reflective mat which confines the sight opening to be viewed.

From the foregoing it will be understood that frame A and border frame B are combined at the perimeter of a canvas C or the like, so as to establish the sight opening therefor. The canvas C is installed directly or indirectly in a rearwardly opening rabbet 15 in the inner margin of the border frame member, and for example an intermediate trim frame T is carried in said rabbet and which in turn carries the canvas C through its canvas frame 10. The outer perimeter of the border frame B presents an outwardly and forwardly offset right angle corner defined by its front wall 16 and outer wall 17, said front wall being spaced parallel from the surface 12 and substantially outward from the corner frame 10, and it is the corner at walls 16 and 17 that receives the frame A. However and in accordance with this invention, I provide a subframe SF that extends between the border frame B and main frame A; projecting outwardly and forwardly so as to establish an extended right angle corner further removed both outwardly and forwardly from the canvas frame 10 and planar surface 12.

The sub frame SF can vary in cross sectional configuration and involves generally, a rear wall 20, a front 21 and an outer wall 22; the walls 20 and 21 being spaced and parallel and the wall 22 being normal to wall 21. A decorative arcuately concaved face 23 extends between an inner wall 24 and the said front wall 21, the outward and forward offset of the corner at walls 21 and 22 being substantial. As shown, there is an interface joinder of the walls 16 and 20 so that the frames B and SF are carried one by the other with the corner at walls 20 and 21 adapted to engage and/or supportably engage the main frame A next to be described.

Figure 2:
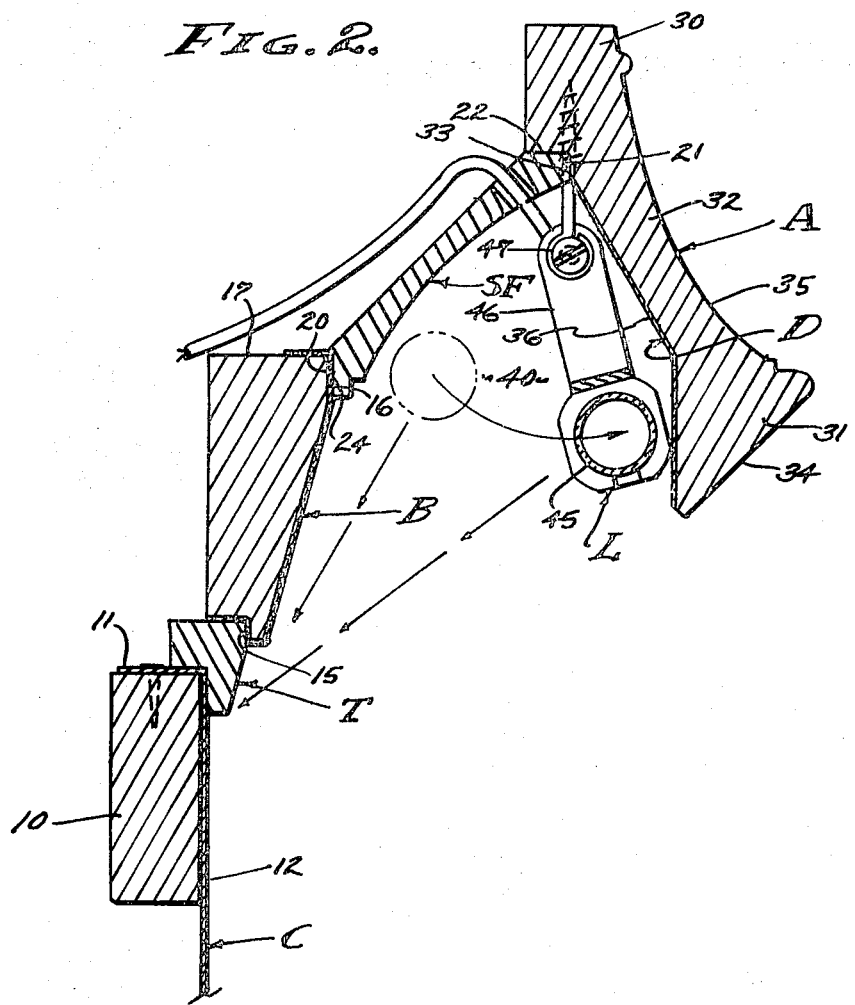

Referring now to the first form of the invention shown in FIGS. 1 and 2 wherein there is directly adjustable lighting means L, the main frame A is fixed to the sub frame SF to project inwardly and forwardly from the corner (21-22) extremity of said sub frame; and in doing so the said frame A partially overlies the border frame B to form a hood overlying the sub frame SF and part of said border frame B. The frame A can vary in cross sectional configuration and involves generally, an outer perimeter portion 30, an inner sight portion 31, and an intermediate portion 32. The portions 30, 31 and 32 comprise the decorative features of the frame A which vary as may be required, and as shown the outer perimeter 30 involves, a wall engageable interfacially with the front wall 21 and/or outer wall 22 (or both) of the sub frame SF, a molded cross section at the inner sight portion 31 and preferably an inward bevel 34, and a contoured wall 35. In the preferred form, the interfacially engageable wall of the other perimeter portion 30 involves a wall 33 that is engageably affixed to the front wall 21 of the sub frame B. The exterior of frame A is decorative while the interior establishes a utilitarian reflective diffuser D and as shown the frame A presents an inner reflector 36 in the form of a rearwardly disposed and reflective light diffusing wall faced diagonally toward the surface 12. The inner margin of frame A depends vertically in the area of portion 31 while intermediate portion 32 extends (for example, at an angle). Thus, a concaved light box 40 is established to house and thereby accommodate the adjustable lighting means L.

The light box 40 opens laterally inward with the reflective diffuser D establishing the rearwardly and inwardly reflective wall. In practice, the inward and forward extension of frame A is substantial and greater than the comparable extension of sub frame SF, and in accordance with the invention I provide adjustable lighting means L in the form of lighting tubes 45 that are shiftably carried on arms 46 moveably carried between the lower extremity of sub frame SF and the lower extremity of frame A. In the preferred form of this embodiment the lighting tubes 45 extend more or less coextensively along the frame A, and depend on the swinging arms 45 that are frictionally mounted to the frame combination at the juncture of the sub frame and main frame. Suitable anchor pivots 47 (screw fasteners) frictionally mount the arms 46 to depend as shown. The arms 46 swing so as to carry the tubes fore and aft between the sub frame SF and main frame A, thereby affording adjustment distance from the reflector 36 of the diffuser D.

Referring now the the second form of the invention shown in FIGS. 3-6 wherein there is remotely adjustable retractable light L', the main frame A' is comprised of one or more moveable sections that are shiftable relative to the sub frame SF which remains as it is above described. In accordance with this form of the invention there is a back frame BF that presents a front face 50 engageable with and which extends and offsets the interface plane of walls 20 and 16. The frame A' is essentially the same as frame A above described and involves portions 30', 31' and 32', and also the reflector D' and its rearwardly disposed light diffusing reflector 36'. The sight portion 31' can be secured to the extended front wall 21 of sub frame SF (see FIG. 6); or it can be separated therefrom when the frame A' is secured so as to be moveable (see FIG. 5), in which case the outer perimeter portions 30' of frame A' is rotatably carried upon coaxial pivots 51 supported at the top of and by the back frame BF. In practice, the pivots are mounted in stationary sections of the frame A'. In this form of the invention, the lighting means L' is fixed to the reflector D' of a moveable section of the frame A' at the moveable sight portion 31' thereof; and it is adjustable fore and aft by virtue of the moveable frame section. It will be seen that the moveable frame section can either close against the front wall 21 of the sub frame or it can separate forwardly therefrom carrying the lighting means L' to an extended position forward of the surface 12 that is to be illuminated. Thus, angularity of light is dependent upon the forwardly displaced positioning of the lighting means as applied by either form of the invention.

From the foregoing it will be seen that the fore and aft displacement of the light source changes the angularity of light rays cast upon the surface 12 to be illuminated. The rearwardly disposed diffuser which picks up the light source and reflects the same, spreads the light over a widening area and all to the end that concentration of light is avoided. In the form first described, the fore and aft adjustment of the lighting means L is manual by overcoming the frictional mounting of the arms 46. However, in the second form of the invention the lighting means L' adjustment is remote as shown in FIG. 5; wherein the moveable frame section is positioned by a lever 55 projecting from the moveable frame section and which is shifted by a reciprocating pull rod or cable 56, preferably a flexible cable extending through a housing 57 that can be conveniently trained and suitably anchored for placement of a push and pull control knob 58. A normally closed switch 59 is opened by closure of the shiftable frame section against wall 21 of the sub frame SF. It will be apparent that the moveable frame section A can be closed for retraction and switching off of lighting means L', or extended as may be required in order to achieve an "on"

condition and the most efficient lighting condition as circumstances require.

Having described only typical preferred forms and applications of my invention, I do not wish to be limited or restricted to the specific details herein set forth, but wish to reserve to myself any modifications or variations that may appear to those skilled in the art.

I claim:

1. An adjustably illuminated picture frame for the optimum lighting of a planar surface as circumstances require, and including; a combination of frame members surrounding the perimeter of the said planar surface and at least one section of which comprises a first frame member that projects outwardly from the perimeter of and forwardly from said planar surface and a second member that projects inwardly and forwardly from the outward and forward extremity of said first frame member the said combination of frame members forming an inwardly open recess extended along the perimeter and with a rearwardly disposed and reflective light diffusing wall, and there being a moveable lighting means within the recess and shiftable rearwardly for adjustable proximity to said light diffusing wall and angular displacement from said planar surface.

2. The adjustably illuminated picture frame as set forth in claim 1 and wherein the lighting means is coextensive with the said at least one section of the combination of frame members.

3. The adjustably illuminated picture frame as set forth in claim 1 and wherein the light means depends upon an arm pivoted to the combination of frame members at the juncture of said first and second members thereof.

4. The adjustably illuminated picture frame as set forth in claim 1, wherein the combination of frame members comprises a border frame intermediate the said perimeter of the said planar surface and the said surrounding first frame member, and wherein the lighting means depends upon an arm pivoted to the combination of frame members at the juncture of said first and second members thereof.

5. The adjustably illuminated picture frame as set forth in claim 1, wherein the lighting means is elongated and coextensive with the said at least one section of the combination of frame members, and wherein said lighting means depends upon spaced arms pivoted to the combination of frame members at the juncture of said first and second members thereof.

6. The adjustably illuminated picture frame as set forth in claim 1 and wherein the light means depends upon a moveable arm frictionally pivoted to the combination of frame members at the juncture of said first and second members thereof.

7. The adjustably illuminated picture frame as set forth in claim 1, wherein the combination of frame members comprises a border frame intermediate the said perimeter of the said planar surface and the said surrounding first frame member, and wherein the lighting means depends upon a moveable arm frictionally pivoted to the combination of frame members at the juncture of said first and second members thereof.

8. The adjustably illuminated picture frame as set forth in claim 1, wherein the lighting means is elongated and coextensive with the said at least one section of the combination of frame members, and wherein said lighting means depends upon spaced moveable arms frictionally pivoted to the combination of frame members at the juncture of said first and second members thereof.

9. An adjustably illuminated picture frame for the optimum lighting of a planar surface as circumstances require, and including; a combination of frame members surrounding the perimeter of the said planar surface and at least one section of which comprises a first sub frame member that projects outwardly from the perimeter of and forwardly from said planar surface and a second frame member that overlies the said first sub frame member and projects inwardly and forwardly forming an inwardly open recess extending along the perimeter and with a rearwardly disposed and reflective light diffusing wall, and there being a moveable light means within the recess and shiftable rearwardly for adjustable proximity to said planar surface.

10. The adjustably illuminated picture frame as set forth in claim 9 and wherein the lighting means is coextensive with the said at least one section of the combination of frame members.

11. The adjustably illuminated picture frame as set forth in claim 9 and wherein the lighting means depends upon an arm pivoted to the combination of frame members at the juncture of said first and second members thereof.

12. The adjustably illuminated picture frame as set forth in claim 9, wherein the lighting means is affixed to the second frame member rearward of said light diffusing wall, and wherein the second frame member is forwardly shiftable from the said first sub frame member thereby displacing the lighting means from said planar surface.

13. The adjustably illuminated picture frame as set forth in claim 9, wherein the lighting means is affixed to the second frame member rearward of said light diffusing wall, and wherein said second frame member is pivoted to engage and shift forwardly and away from the said first sub frame member thereby displaceably exposing said lighting means to said planar surface.

14. The adjustably illuminated picture frame as set forth in claim 9, wherein the combination of frame members comprises a back frame member extending outwardly from the first sub frame member, wherein the lighting means is affixed to the second frame member rearward of said light diffusing wall, and wherein said second frame member is pivoted at the outer extremity of said back frame member and shiftable therefrom and from the said first sub frame member thereby displaceably exposing said lighting means to said planar surface.

15. The adjustably illuminated picture frame as set forth in claim 9, wherein the lighting means is affixed to the second frame member rearward of said light diffusing wall, wherein the second frame member is forwardly shiftable from the said first sub frame member thereby displacing the lighting means from said planar surface, and wherein a manual control means remote from the said second frame member engages therewith and shifts the same.

16. The adjustably illuminated picture frame as set forth in claim 9, wherein the lighting means is affixed to the second frame member rearward of said light diffusing wall, wherein said second frame member is pivoted to engage and shift forwardly and away from the said first sub frame member thereby displaceably exposing said lighting means to said planar surface, and wherein a manual control means remote from the said second frame member engages therewith and shifts the same.

17. The adjustably illuminated picture frame as set forth in claim 9, wherein the combination of frame members comprises a back frame member extending outwardly from the first sub frame member, wherein the lighting means is affixed to the second frame member rearward of said light diffusing wall, wherein said second frame member is pivoted at the outer extremity of said back frame member and shiftable therefrom and from the said first sub frame member thereby displaceably exposing said lighting means to said planar surface, and wherein a manual control means remote from the said second frame member engages therewith and shifts the same.

18. The adjustably illuminated picture frame as set forth in claim 9, wherein the lighting means is affixed to the second frame member rearward of said light diffusing wall, and wherein the second frame member is forwardly shiftable from the said first sub frame member thereby displacing the lighting means from said planar surface, and wherein a manual control means comprises a moveable knob remote from the said second frame member and a lever projecting from said member with a shifting element extending therebetween.

19. The adjustably illuminated picture frame as set forth in claim 9, wherein the lighting means is affixed to the second frame member rearward of said light diffusing wall, wherein said second frame member is pivoted to engage and shift forwardly and away from the said first sub frame member thereby displaceably exposing said light means to said planar surface, and wherein a manual control means comprises a moveable knob remote from the said second frame member and a lever projecting from said member with a shifting element extending therebetween.

20. The adjustably illuminated picture frame as set forth in claim 9, wherein the combination of frame members comprises a back frame member extending outwardly from the first sub frame member, wherein the lighting means is affixed to the second frame member rearward of said light diffusing wall, and wherein said second frame member is pivoted at the outer extremity of said back frame member and shiftable therefrom and from the said first sub frame member thereby displaceably exposing said lighting means to said planar surface, and wherein a manual control means comprises a moveable knob remote from the said second frame member and a lever projecting from said member with a shifting element extending therebetween.

* * * * *